UNITED STATES PATENT OFFICE.

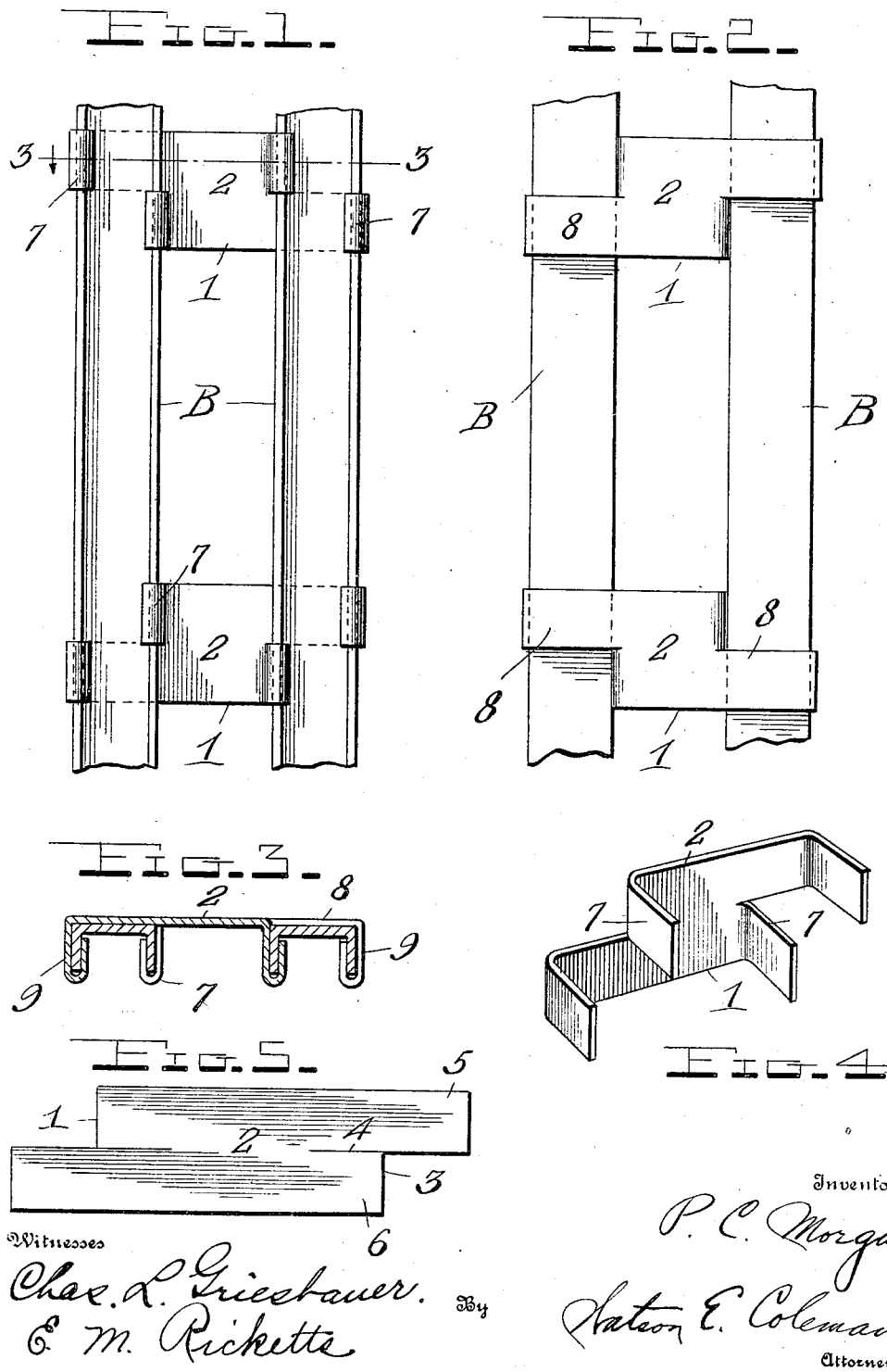

PETER C. MORGAN, OF SAN FRANCISCO, CALIFORNIA.

CLIP FOR CHANNEL-IRONS.

968,586.    Specification of Letters Patent.    Patented Aug. 30, 1910.

Application filed July 10, 1909. Serial No. 506,991.

*To all whom it may concern:*

Be it known that I, PETER C. MORGAN, a citizen of the United States, residing at San Francisco, in the county of San Francisco and State of California, have invented certain new and useful Improvements in Clips for Channel-Irons, of which the following is a specification, reference being had to the accompanying drawings.

This invention relates to improvements in metal clips for connecting channel irons and more particularly channel iron studding used in partitions of fire proof buildings.

The object of the invention is to provide a clip of this character which will be less expensive and stronger than similar clips heretofore devised for this purpose.

With the above and other objects in view, as will hereinafter more fully appear, the invention consists in the novel features of construction hereinafter described and claimed, and illustrated in the accompanying drawings, in which—

Figure 1 is an elevation showing channel iron studding united by my improved clips; Fig. 2 is a similar view looking toward the opposite side of the same; Fig. 3 is a horizontal section taken on the plane indicated by the line 3—3 in Fig. 1; Fig. 4 is a perspective view of one of the clips ready for application to the channel irons; and Fig. 5 is a plan view of the blank from which the clip is formed.

In the drawings 1 denotes my improved clips which are especially adapted for uniting two channel iron studdings B. The clip is formed from a single sheet or plate of metal and has a rectangular body portion 2 which is disposed between the irons B and which is solid, as shown. The plate or sheet forming the clip has its diagonally opposite corners notched, as shown at 3 in Fig. 5, and the ends of the plate are slit longitudinally, as indicated at 4, so that long and short tongues 5, 6 are formed at each end of the plate. These tongues are adapted to be bent around the flanges of the channel iron B, the two short tongues 6 being bent around the inner or adjacent flanges of said channel irons while the long tongues 5 are bent around the outer flanges of said irons, as clearly shown in Fig. 3. The two short tongues 6 are first bent at right angles from the body 2, as shown at 7, so as to form stops against which the channel irons B abut and which serve to space said irons apart. The long tongues 6 extend across the closed or connecting portions of the channel irons, as shown at 8, and are then bent at right angles, as shown at 9, to engage the outer faces of the outer flanges of the channel irons.

The use of the invention will be readily understood upon reference to Figs. 1, 2 and 3 of the drawings and it will be seen by constructing the clip in the manner shown and described that it may be produced at a very small cost and will be exceedingly strong and effective. By arranging the fastening tongues in pairs and at the opposite ends of the body of the plate, such body portion which is disposed between the two beams is left solid and is therefore not weakened so that the device will be exceedingly strong. This peculiar arrangement of the tongues not only obviates the weakening of the body of the plate by the formation of tongues within it but it also enables the clip to be produced with a minimum amount of material and permits it to be produced at a small cost.

Having thus described the invention what is claimed is:

As an article of manufacture the herein-described metal clip for uniting two channel metal beams, consisting of a flat, solid, rectangular body portion formed at diagonally opposite corners with the right-angularly projecting tongues 7, and at its other corners with the outwardly projecting arms 8 having the right-angularly projecting tongues 9, said tongues 7 and 9 projecting from the same side face of the body portion of the clip and in parallel relation for the purpose set forth.

In testimony whereof I hereunto affix my signature in the presence of two witnesses.

PETER C. MORGAN.

Witnesses:
GEO. H. MATSON,
J. J. ADDLEMAN.